(12) United States Patent
Ozawa

(10) Patent No.: US 7,092,062 B2
(45) Date of Patent: Aug. 15, 2006

(54) LIQUID CRYSTAL DISPLAY DEVICE AND ELECTRONIC APPARATUS HAVING CHOLESTERIC LIQUID CRYSTAL REFLECTIVE LAYER

(75) Inventor: Kinya Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/278,923

(22) Filed: Oct. 24, 2002

(65) Prior Publication Data

US 2003/0081161 A1 May 1, 2003

(30) Foreign Application Priority Data

Oct. 24, 2001 (JP) ............... 2001-326522

(51) Int. Cl.
*G02F 1/1345* (2006.01)
(52) U.S. Cl. ............. 349/152; 349/106; 349/113; 349/114; 349/115
(58) Field of Classification Search .......... 349/106, 349/113, 114, 115, 152
See application file for complete search history.

(56) References Cited

U.S. PATENT DOCUMENTS

| | | | |
|---|---|---|---|
| 5,841,494 A | 11/1998 | Hall | |
| 6,304,736 B1 | 10/2001 | Gomi et al. | |
| 6,515,729 B1 * | 2/2003 | Hoshino | 349/158 |
| 6,621,543 B1 * | 9/2003 | Moon | 349/115 |
| 6,636,291 B1 * | 10/2003 | Van De Witte et al. | 349/187 |
| 6,646,708 B1 * | 11/2003 | Muramatsu | 349/149 |
| 6,693,689 B1 | 2/2004 | Kim et al. | |
| 2001/0020990 A1 | 9/2001 | Moon | |
| 2001/0055083 A1 * | 12/2001 | Jiang et al. | 349/115 |
| 2002/0135719 A1 * | 9/2002 | Moon et al. | 349/115 |

FOREIGN PATENT DOCUMENTS

| | | |
|---|---|---|
| JP | 08-278489 | 10/1996 |
| JP | 10-319860 | 12/1998 |
| JP | A 2000-131684 | 5/2000 |
| JP | A 2000-171789 | 6/2000 |
| JP | A 2000-193962 | 7/2000 |
| JP | A 2000-227590 | 8/2000 |

(Continued)

OTHER PUBLICATIONS

JP 2000347179A English translation by Computer.*
Chinese Office Action dated Mar. 12, 2004 (2 pages).

*Primary Examiner*—Andrew Schechter
*Assistant Examiner*—Michael H Caley
(74) *Attorney, Agent, or Firm*—Oliff & Berridge, PLC

(57) ABSTRACT

The invention prevents a connection failure arising from an ingress of a conductive material, such as a solder ball, into a cholesteric liquid crystal layer in a liquid crystal display device having the cholesteric liquid crystal layer on a substrate when an electronic component is mounted to be connected to a conductor arranged on the substrate having the cholesteric liquid crystal layer thereon. A liquid crystal display device includes a liquid crystal cell having a liquid crystal layer between an upper substrate and a lower substrate bonded to each other with a sealing member interposed therebetween. First conductors are arranged on the inner surface of the lower substrate and second conductors are arranged on the inner surface of the upper substrate. A transflective layer containing a cholesteric liquid crystal layer is arranged between the lower substrate and the first conductors. Electronic components are mounted on the inner surface of the upper substrate outside the sealing member. The electronic components are electrically connected to the second conductors and are electrically connected to the first conductors through inter-substrate conductors.

12 Claims, 6 Drawing Sheets

FOREIGN PATENT DOCUMENTS

| | | | |
|---|---|---|---|
| JP | 2000347179 A | * | 12/2000 |
| JP | A 2001-83541 | | 3/2001 |
| JP | A 2001-209046 | | 8/2001 |
| JP | A 2003-262886 | | 9/2003 |
| KR | 2001-0045205 | | 6/2001 |
| WO | WO 01/26079 A1 | * | 4/2001 |

* cited by examiner

LIQUID CRYSTAL DISPLAY DEVICE AND ELECTRONIC APPARATUS HAVING CHOLESTERIC LIQUID CRYSTAL REFLECTIVE LAYER

BACKGROUND OF THE INVENTION

1. Field of Invention

The present invention relates to a liquid crystal display device and electronic apparatus. More particularly, the invention relates to a liquid crystal display device which reduces or prevents a connection failure due to the ingress of a conductive material, such as a solder ball, into a cholesteric liquid crystal layer when an electronic component is mounted to be connected to a conductor formed on a substrate having the cholesteric liquid crystal layer.

2. Description of Related Art

Reflective-type liquid crystal display devices can be applied in a variety of mobile electronic apparatus because they do not have a light source, such as a back-light, incorporated therein, and thus they consume less power. Reflective-type liquid crystal display devices take advantage of ambient light, such as natural light or illumination light, but are difficult to view under dark conditions. Liquid crystal display devices have been proposed which use ambient light under light conditions as in an ordinary reflective-type liquid crystal display device, while presenting a display via an internal light source under dark conditions. This type of liquid crystal display device employs a reflective and transmissive display method. Depending on the ambient light level, the device switches between a reflective mode and a transmissive mode. The device presents a distinct display under dark conditions while saving power. In this specification, this type of liquid crystal display device is referred to as a "transflective-type liquid crystal display device."

In one proposed transflective-type liquid crystal display device, a reflective layer, formed of a metal film such as aluminum or the like and having slits (apertures), to transmit light is arranged on the inner surface of a lower substrate (in this specification, one surface of the substrate facing the liquid crystal is referred to as an "inner surface", and the other surface of the substrate opposite from the inner surface is referred to as an "outer surface"), and the reflective layer functions as a transflective layer. In this liquid crystal display device, the use of the metal film arranged on the inner surface of the lower substrate controls the parallax of the display device due to the thickness of the lower substrate, and particularly, prevents color mixing if the structure using a color filter is adopted.

FIG. 8 illustrates a related art transflective liquid crystal display device having this type of transflective layer.

The liquid crystal display device 100 includes liquid crystal cells including a liquid crystal 103 encapsulated between a pair of transparent substrates 101 and 102. A reflective layer 104 and an insulator 106 are laminated on the lower substrate 101. Lower electrodes 108, which are electrically conductive transparent layers fabricated of indium tin oxide (hereinafter referred to ITO), are formed on the insulator 106. An alignment layer 107 is formed to cover the lower electrode 108. On the other hand, a color filter 109 having color layers of R (red), G (green), and B (blue) is formed on the upper substrate 102. A planarization layer 111 is laminated on the color filter 109. Upper electrodes 112, fabricated of electrically conductive transparent film such as ITO, are formed on the planarization layer 111. An alignment layer 113 is then deposited to cover the upper electrodes 112 from below.

The reflective layer 104 is fabricated of a metal having a high light reflectance such as aluminum, and has a slit 110 to transmit light for each pixel. Through the slit 110, the reflective layer 104 can function as a transflective layer (hereinafter, the reflective layer 104 is referred to as a "transflective layer"). Arranged on the outer surface of the upper substrate 102 are a forward diffuser 118, a retardation film 119, and an upper polarizer 114 in that order from the upper substrate 102. Arranged on the outer surface of the lower substrate 101 are a ¼-wave plate 115, and a lower polarizer 116 in that order from the lower substrate 101. A backlight 117 (an illumination device) is arranged beneath the lower polarizer 116 below the bottom surface of the lower substrate 101.

When the liquid crystal display device 100 shown in FIG. 8 is used in a reflective mode under light conditions, external light, such as sunlight or illumination light entering from above the upper substrate 102, is transmitted through the liquid crystal 103, is reflected from the surface of the transflective layer 104 on the lower substrate 101, is transmitted through the liquid crystal 103 again, and then exits toward the upper substrate 102. When the liquid crystal display device 100 is used in a transmissive mode under dark conditions, light emitted from the backlight 117 arranged below the lower substrate 101 is passed through the slit 110 of the reflective layer 104, is transmitted through the liquid crystal 103, and then exits toward the upper substrate 102. These light rays contribute to image displaying in each mode.

In the reflective-type liquid crystal display device, a metal film having a high light reflectance, such as aluminum or silver, has been used in the related art for the reflective layer. A dielectric mirror can be formed of dielectric thin films having different refractive indices alternately laminated, a reflective cholesteric plate formed of a cholesteric liquid crystal, or a reflective hologram plate using a hologram element is used for the reflective layer in the reflective-type liquid crystal display device. These reflective plates not only reflect light, but also have other functions.

In particular, the cholesteric liquid crystal exhibits a liquid crystal phase above a certain temperature (liquid crystal transition temperature), in which liquid crystal molecules take a helical structure configuration with a constant pitch. This structure has the property that the cholesteric liquid crystal selectively reflects light having a wavelength coinciding with the helical pitch thereof while transmitting light having other wavelengths. The helical pitch is controlled by the intensity of ultraviolet light or temperature at the curing of the liquid crystal. The color of reflected light is localized, and the cholesteric liquid crystal is thus used as a reflective color filter.

If a plurality of cholesteric liquid crystal layers reflecting light rays of different colors are laminated, the cholesteric liquid crystal functions as a reflective plate that reflects white light.

SUMMARY OF THE INVENTION

In the transflective-type liquid crystal display device employing the above-referenced cholesteric liquid crystal layer, an electronic component to be connected to a conductor, such as an electrode arranged on the substrate having the cholesteric liquid crystal layer thereon, is mounted on the inner surface of the substrate, using a COG (Chip On Glass) method. However, the cholesteric liquid crystal layer has no sufficient hardness to withstand pressure applied in the course of the mounting process. Electrically conductive particles, such as solder balls, ingress into the cholesteric liquid crystal layer, causing a connection failure. The yield of the device may drop and the reliability of the product may be degraded. Such a problem is not limited to a passive-matrix reflective-type liquid crystal display device and an active-matrix reflective-type liquid crystal display device, each device employing the cholesteric liquid crystal layer. A passive-matrix transflective-type liquid crystal display device and an active-matrix transflective-type liquid crystal display device also suffer from the same problem.

In a related art transflective liquid crystal display device shown in FIG. 8, the user views the display regardless of the presence or absence of ambient light. The lightness level of the screen during the transmissive mode is significantly lower than that during the reflective mode. This is attributed to the fact that the display during the transmissive mode uses only half the light beams emitted from a backlight, that the display during the transmissive mode uses only the light beams passed through the slits of the transflective layer, and that the ¼-wave plate and the lower polarizer are arranged on the outer surface of the lower substrate.

In the related art transflective liquid crystal display device, the display mode changes between during reflection and during transmission of light. During transmission, approximately half the light emitted from the backlight is absorbed by the upper polarizer, and approximately remaining half of the emitted light is used to provide display. Specifically, linearly polarized light incident on the upper substrate is fully used for a light display during the reflective mode. During the transmissive mode, light traveling from the lower surface of the liquid crystal layer to the upper substrate must be substantially circularly polarized to present a display of the same lightness level as that presented during the reflective mode. Since approximately half the circularly polarized light is absorbed by the upper polarizer when the light exits from the upper substrate, approximately half the light incident on the liquid crystal layer contributes to image displaying during the transmissive mode. In the basic principle, the related art transflective liquid crystal display device inherently provides a dark display.

During the transmissive mode, the display is presented making use of light passed through the slits. The area of the slits to the entire area of the transflective layer (namely, an aperture ratio) determines the lightness level of the display. If the aperture ratio is increased, the display becomes bright during the transmissive mode. With a high aperture ratio, however, the non-aperture area of the transflective layer decreases, darkening the display during the reflective mode. To assure the brightness of the display during the reflective mode, the aperture ratio of the slits must not be increased above a certain limit. The brightening the display during the transmissive mode is thus subject to a limitation.

The basic principle of the transflective-type liquid crystal display device requires the use of the ¼-wave plate on the outer surface of the lower substrate. The reason why the liquid crystal display device lacks brightness because of the ¼-wave plate during the transmissive mode is discussed. In the discussion that follows, a dark display is presented with a non-selection voltage applied state while a light display is presented with a selection voltage applied state.

When a dark display is presented in the liquid crystal display device 100 illustrated in FIG. 8 during the reflective mode, and when the transmission axis of the upper polarizer 114 is parallel with the plane of the page, the light incident on the outer surface of the upper substrate 102 from outside becomes linearly polarized light having the polarization axis parallel with the plane of the page when being transmitted through the upper polarizer 114 over the upper substrate 102, and then becomes generally circularly polarized light through birefringence of the liquid crystal 103 when being transmitted through the liquid crystal 103. The light becomes reverse circularly polarized light when being reflected from the surface of the transflective layer 104 on the lower substrate 101. When being transmitted through the liquid crystal 103 again, the light becomes linearly polarized light having the polarization axis perpendicular to the plane of the page, and then reaches the upper substrate 102. Since the upper polarizer 114 above the upper substrate 102 has the transmission axis thereof parallel with the plane of the page, the light reflected from the transflective layer 104 is absorbed by the upper polarizer 114, thereby failing to return to the outside of the liquid crystal display device 100 (to a viewer). The liquid crystal display device 100 thus presents a dark display.

When a light display is presented during the reflective mode, the alignment direction of the liquid crystal 103 is changed in response to the application of a selected voltage to the liquid crystal 103. Ambient light incident from outside the upper substrate 102 becomes linearly polarized light when being transmitted through the liquid crystal 103. The light is reflected from the transflective layer 104, and is transmitted through the upper polarizer 114 above the upper substrate 102 as linearly polarized light having the polarization axis parallel with the plane of the page, and then returns to the outside (to the viewer). The liquid crystal display device 100 thus presents a light display.

When a display is presented on the liquid crystal display device 100 during the transmissive mode, light emitted from the backlight 117 is incident on the liquid crystal cell from outside the lower substrate 101, and a portion of the light passed through the slits 110 contributes to image displaying.

To present a dark display on the liquid crystal display device 100, the light traveling from the slit 110 to the upper substrate 102 must be generally circularly polarized in the same manner as during the reflective mode as already described. Because the light emitted from the backlight 117 and passed through the slit 110 must be generally circularly polarized, the ¼-wave plate 115 is required to convert the linearly polarized light, after being transmitted through the lower polarizer 116, into generally circularly polarized light. The ¼-wave plate has the capability to convert the linearly polarized light into generally circularly polarized light at a certain wavelength.

A portion of light emitted from the backlight 117 but not passed through the slit 110 is discussed. When the transmission axis of the lower polarizer 116 is perpendicular to the plane of the page, the light emitted from the backlight 117 becomes linearly polarized light having the polarization direction perpendicular to the plane of the page when being transmitted through the lower polarizer 116. The linearly polarized light becomes generally circularly polarized light when being transmitted through the ¼-wave plate 115, and then reaches the transflective layer 104. When the light is then reflected from the bottom surface of the transflective layer 104, the light becomes reverse circularly polarized light. When being transmitted through the ¼-wave plate 115 again, the light becomes linearly polarized light having the polarization axis thereof parallel with the plane of the page. The linearly polarized light is then absorbed by the lower polarizer 116 having the transmission axis thereof perpendicular to the plane of the page. In other words, out of the light emitted from the backlight 117, the portion of the light not passed through the slit 110 is reflected from the bottom surface of the transflective layer 104, and is mostly absorbed by the lower polarizer 116 below the lower substrate 101.

Most of the light that is not passed through the slit 110 and reflected from the transflective layer 104 during the transmissive mode is absorbed by the lower polarizer 116 below the lower substrate 101 in the transflective-type liquid crystal display device 100. This means that a fraction of the light emitted from the backlight 117 contributes to image displaying. If the light emitted from the backlight 117 is transmitted through the lower polarizer 116 without being absorbed by the lower polarizer 116, and returns to the backlight 117, the light just emitted from the backlight 117 and the returning light effectively heighten luminance of the backlight 117. The lightness level during the transmissive mode is heightened. If the light that is not passed through the slit 110 and then reflected from the transflective layer 104 is reused, the lightness level during the transmissive mode is heightened. The related art cannot achieve the reuse of the reflected light.

The present invention has been developed to address or resolve the above problem, and the present invention provides a liquid crystal display device having a cholesteric liquid crystal layer on a substrate in which a connection failure due to an ingress of a conductive material, such as a solder ball, into the cholesteric liquid crystal layer is prevented when an electronic component to be connected to a conductor formed on the substrate having the cholesteric liquid crystal layer thereon is mounted.

The present invention also provides a liquid crystal display device having the cholesteric liquid crystal layer functioning as a transflective layer. The liquid crystal display device presents an excellent visibility with a bright display during a transmissive mode.

The present invention also provides electronic apparatus incorporating a liquid crystal display device which is free from a drop in yield due to a connection failure between a conductor formed on the substrate having the cholesteric liquid crystal layer thereon, and an electronic component connected to the conductor, and which has enhanced reliability.

The present invention also provides electronic apparatus incorporating the liquid crystal display device presenting an excellent visibility with a bright display also during the transmissive mode.

To address or achieve the above advantages, a liquid crystal display device of the present invention includes a liquid crystal cell including an upper substrate and a lower substrate, mutually facing and bonded to each other with a sealing member interposed therebetween, a liquid crystal layer encapsulated between the upper substrate and the lower substrate, a first conductor arranged on the inner surface of the lower substrate, and a second conductor arranged on the inner surface of the upper substrate. The liquid crystal display device includes a reflective layer including a cholesteric liquid crystal layer, between the lower substrate and the first conductor, to reflect at least a portion of elliptically polarized light having a predetermined rotation direction, and an upper-substrate side elliptically-polarized-light input device to cause elliptically polarized light to enter the liquid crystal layer from the upper substrate side. The liquid crystal layer reverses the component of elliptically polarized light that is incident during one of a selection electric field applied state and a non-selection electric field applied state, and does not change the component of the elliptically polarized light during the other of the selection electric field applied state and the non-selection electric field applied state. The liquid crystal display device further includes an electronic component mounted on the inner surface of the upper substrate outside the sealing member. The electronic component is electrically connected to the second conductor, while being electrically connected to the first conductor through an inter-substrate conductor.

For example, the "first conductor" and the "second conductor" refer to wirings, such as a data line or a scanning line, in an active-matrix type liquid crystal display device, or a segment electrode or a common electrode in a passive-matrix liquid crystal display device. In the active-matrix type liquid crystal display device, one of the first conductor and the second conductor is the data line and the other is the scanning line.

The "electronic component" refers to a driving IC or a capacitor used in a driving circuit in the liquid crystal display device.

The first conductor and the second conductor may include a wiring routed to be connected to the electronic component or a interconnection wiring for connection.

In this invention, light rays introduced to the liquid crystal layer from the upper substrate and the lower substrate are both "elliptically polarized". In practice, the light rays are typically "circularly polarized". It is not a requirement that the light rays be completely circularly polarized. If the light is "elliptically polarized light" in a broad sense, it is acceptable. The light reflected from the cholesteric liquid crystal layer is the "elliptically polarized light having a predetermined rotation direction". In practice, the light reflected from the cholesteric liquid crystal layer is typically "circularly polarized light having a predetermined rotation direction." It is not a requirement that the light reflected from the cholesteric liquid crystal layer be completely circularly polarized. If the light is "elliptically polarized light" in a broad sense, it is acceptable.

In the liquid crystal display device, preferably, the reflective layer is a transflective layer including a cholesteric liquid crystal layer to reflect a portion of elliptically polarized light having a predetermined rotation direction while transmitting the other portion of the elliptically polarized light therethrough, and the liquid crystal display device further includes a lower-substrate side elliptically-polarized-light input device to cause elliptically polarized light to enter from the lower substrate.

The cholesteric liquid crystal layer for the reflective layer or the transflective layer in the liquid crystal display device is produced as below. A cholesteric liquid crystal is applied on an alignment layer already subjected to a rubbing process using one of a variety of application methods, such as a spin coating method. The helical pitch of the liquid crystal molecules is controlled by controlling the intensity of ultraviolet light or temperature when the cholesteric liquid crystal is irradiated with the ultraviolet light to cure itself. The liquid crystal molecules have a periodic helical structure with a constant pitch. The cholesteric liquid crystal layer thus reflects at least a portion of the elliptically polarized light having a predetermined rotation direction, or reflects a portion of the elliptically polarized light having a predetermined rotation direction while transmitting another portion of the elliptically polarized light having the predetermined rotation direction.

However, if a mounting process such as a COG (Chip On Glass) method is carried out to mount the electronic component to be connected to the first conductor on the inner surface of the lower substrate having the cholesteric liquid crystal layer formed thereon, electrically conductive particles (an electrically conductive material), such as a solder balls, ingress into the cholesteric liquid crystal layer, causing a connection failure because the cholesteric liquid crystal layer has no sufficient hardness to withstand pressure applied in the course of the mounting process.

In accordance with the present invention, the electronic component electrically connected to the first conductor on the lower substrate and the second conductor arranged is mounted on the substrate having no cholesteric liquid crystal layer, namely, on the upper substrate. In this arrangement, no electronic components are mounted on the cholesteric liquid crystal layer. The electronic component is thus reliably connected to the first conductor and the second conductor, heightening the yield and quality of the product.

The first conductor arranged on the lower substrate is electrically connected to the electronic component arranged on the upper substrate through an inter-substrate conductor.

In accordance with the present invention, the electronic components are arranged on the same side of the upper substrate, thus on the same side of the liquid crystal cell. There is no need to arrange areas for electronic components on the remaining three sides of the liquid crystal cell. The widths of peripheral areas on both right and left sides or top and bottom sides of the liquid crystal cell are equalized. A compact liquid crystal display device with narrow peripheral areas thus results. The peripheral areas refer to an area other than the display area of the liquid crystal cell, namely a non-display area.

The cholesteric liquid crystal has the so-called selective reflectivity in which the cholesteric liquid crystal selectively reflects circularly polarized light having the wavelength thereof equal to the helical pitch of the liquid crystal molecules and having the rotation in the same direction as that of the helical structure. In other words, circularly polarized light having a wavelength that is not equal to the helical pitch of the liquid crystal molecules and circularly polarized light having a wavelength that is equal to the helical pitch, but having the rotation in a direction reverse to the helical structure are transmitted through the cholesteric liquid crystal. The cholesteric liquid crystal layer reflects at least a portion of circularly polarized light having the wavelength equal to the pitch of the helical structure of the liquid crystal molecules and having the same rotation direction as that of the helical structure. When the cholesteric liquid crystal layer reflects all the light having the wavelength equal to the helical pitch of the liquid crystal molecules and the same rotation direction as that of the helical structure, the cholesteric liquid crystal layer functions as a reflective layer. When the cholesteric liquid crystal layer reflects a portion of the circularly polarized light having the wavelength equal to the helical pitch of the liquid crystal molecules and the same rotation direction as that of the helical structure, the cholesteric liquid crystal layer functions as a transflective layer.

The cholesteric liquid crystal layer of this invention may reflect a portion of circularly polarized light having the wavelength equal to the helical pitch of the liquid crystal molecules and having the same direction of rotation as that of the helical structure, while transmitting another portion of the light. Such a cholesteric liquid crystal layer functions as a transflective layer.

The inventors of the present invention have found using the reflective layer of the cholesteric liquid crystal currently proposed in the reflective-type liquid crystal display device provides the following features. When the light incident on the liquid crystal cell is elliptically polarized, and when the liquid crystal mode is set so that the component of the elliptically polarized light is reversed during one of the selection electric field applied period and the non-selection electric field applied period for the liquid crystal layer, the lightness level in the display mode is equalized between reflection and transmission, and the lightness level is not lowered in the basic principle during the transmissive mode. The inventors have also found that the light reflected from the lower substrate due to the selective reflection of the cholesteric liquid crystal is reused with the related art construction outside the lower substrate remaining unchanged. Based on these facts, the present invention is proposed.

DETAILED DESCRIPTION OF PREFERRED EMBODIMENTS

The display principle of the liquid crystal display device of the present invention when used as a transflective type and the reason why the light reflected from the transflective layer is reused are discussed below with reference to FIG. 4. The display principle on which the liquid crystal display device of the present invention is used as a reflective type is substantially identical to the display principle on which the transflective type is used to present a light display in reflection and a dark display in reflection.

Figure 4:
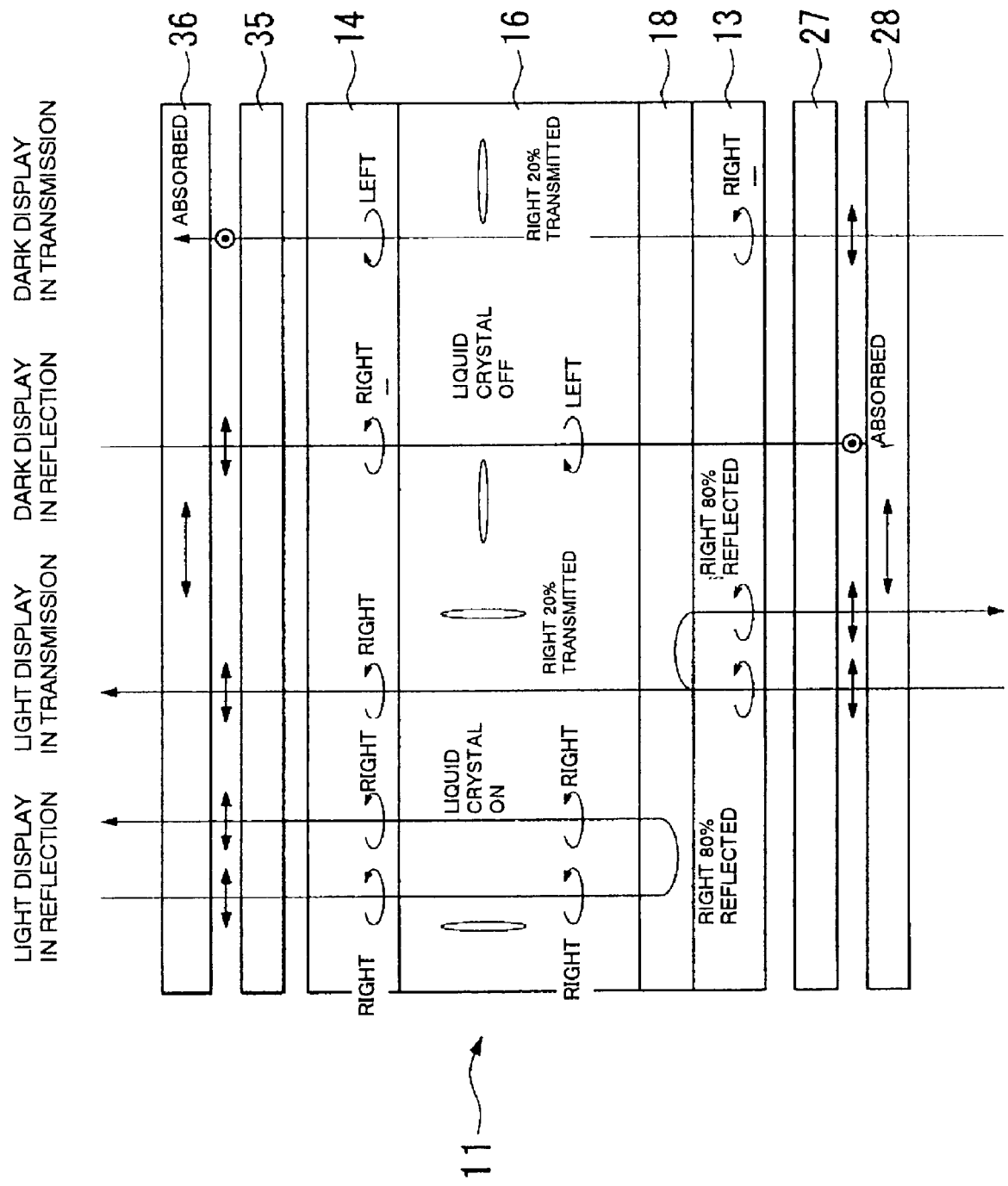
FIG. 4 is a schematic that illustrates the principle of image displaying of the liquid crystal display device of the present invention.

FIG. 4 is a schematic that illustrates the principle of the image displaying performed on the liquid crystal display device of the present invention.

A liquid crystal cell 11 is formed of a pair of light-transmissive substrates, namely, an upper substrate 14 and a lower substrate 13, and a liquid crystal layer 16 encapsulated therebetween. Arranged on the inner surface of the lower substrate 13 is a transflective layer 18 formed of a cholesteric liquid crystal layer. The cholesteric liquid crystal layer reflects a portion of circularly polarized light having a predetermined rotation direction, while transmitting another portion of the light. For example, the cholesteric liquid crystal layer reflects 80% of the clockwise rotating, circularly polarized light (hereinafter referred to as circularly polarized light) while transmitting 20% of the clockwise circularly polarized light.

The liquid crystal display device of this invention includes an upper-substrate side elliptically-polarized-light input device to cause elliptically polarized light to enter the liquid crystal layer 16 from the upper substrate 14. Referring to FIG. 4, the upper-substrate side elliptically-polarizedlight input device includes an upper polarizer 36 to transmit linearly polarized light aligned in one direction, and an upper ¼-wave plate 35 to convert the linearly polarized light transmitted through the upper polarizer 36 to circularly polarized light. As shown, the liquid crystal display device of this invention also includes a lower-substrate side elliptically-polarized-light input device to cause elliptically polarized light to enter the liquid crystal layer 16 from the lower substrate 13. Like the side of the upper substrate 14, the lower-substrate side elliptically-polarized-light input device includes a lower polarizer 28 and a lower ¼-wave plate 27. On the upper substrate and the lower substrate, the transmission axes of the upper polarizer 14 and the lower polarizer 13 are aligned with a direction parallel with the plane of the page of FIG. 4. When the linearly polarized light aligned in this direction is incident on each of the upper ¼-wave plate 35 and the lower ¼-wave plate 27, clockwise circularly polarized light is output. Any retardation film instead of the upper ¼-wave plate 35 may be used. In this case, it suffices to use a retardation film which has the function of converting the linearly polarized light transmitted through the upper polarizer 36 into circularly polarized light. Any retardation film instead of the lower ¼-wave plate 27 may be used. In this case, it suffices to use a retardation film which has the function of converting the linearly polarized light transmitted through the upper polarizer 28 into circularly polarized light.

The liquid crystal layer 16 reverses the rotation direction of the circularly polarized light that is incident depending on the presence or absence of a selection electric field. For example, during the non-selection voltage applied state (with the liquid crystal set to be off), the liquid crystal layer 16 has a phase difference of $\lambda/2$ ($\lambda$: wavelength of the incident light) with the liquid crystal molecules lying down. Clockwise circularly polarized light becomes counterclockwise circularly polarized light when being transmitted through the liquid crystal layer 16, and counterclockwise polarized light becomes clockwise polarized light when being transmitted through the liquid crystal layer 16. When the liquid crystal molecules are in their upright position during the selection voltage applied state (with the liquid crystal set to be on), the liquid crystal layer has no phase difference. The rotation direction of the circularly polarized light remains unchanged.

To present a light display during the reflective mode in the liquid crystal display device illustrated in FIG. 4, the light to be incident on the upper substrate 14 from outside becomes linearly polarized light having the polarization axis parallel with the plane of the page when being transmitted through the upper polarizer 36 on the upper substrate 14, and then becomes clockwise circularly polarized light when being transmitted through the upper ¼-wave plate 35. With the liquid crystal set to be on, the rotation direction of the circularly polarized light remains unchanged unlike the above case. When the clockwise circularly polarized light is incident on the liquid crystal layer 16, the clockwise circularly polarized light remains unchanged when it reaches the transflective layer 18 after being transmitted through the liquid crystal layer 16.

The significant difference between the related art transflective layer employing a metal layer and the transflective layer employing the cholesteric liquid crystal 18 is that the transflective layer employing the metal layer reverses the rotation direction of the circularly polarized light during the reflection, i.e., the clockwise circularly polarized light becomes counterclockwise circularly polarized light when being reflected from the metal layer, while the transflective layer 18 employing the cholesteric liquid crystal keeps the rotation direction of the circularly polarized light when the light is reflected therefrom. In other words, the clockwise circularly polarized light remains unchanged even if it is reflected. Therefore, 80% of the clockwise circularly polarized light is reflected from the transflective layer 18 on the lower substrate, and is then transmitted through the liquid crystal layer 16 toward the upper substrate. Since the liquid crystal is on, the polarization state of the light remains unchanged from the clockwise direction. However, the light becomes linearly polarized light having the polarization axis parallel with the plane of the page when being transmitted through the upper ¼-wave plate 35. The linearly polarized light is transmitted through the upper polarizer 36, thereby returning to the outside (the viewer), and thereby presenting a light display on the liquid crystal display device.

When a dark display is presented during the reflective mode, (see a second light ray from the right in FIG. 4), and when the liquid crystal is set to an off state, the liquid crystal layer has a phase difference of $\lambda/2$. Clockwise circularly polarized light incident on the upper substrate from above becomes counterclockwise circularly polarized light when being transmitted through the liquid crystal layer. Referring to FIG. 4, the cholesteric liquid crystal layer forming the transflective layer reflects a portion of the clockwise circularly polarized light, while transmitting counterclockwise circularly polarized light through the transflective layer. Then, when being transmitted through the lower ¼-wave plate, the light becomes linearly polarized light having the polarization axis perpendicular to the plane of the page. This linearly polarized light does not return to the outside (the viewer) but is absorbed by the lower polarizer. A dark display is thus presented on the liquid crystal display device.

When a display is presented during the transmissive mode, the light emitted from the backlight, for example, enters the liquid crystal cell 11 from outside the lower substrate 13, and becomes light contributing to image displaying. To present a dark display during the transmissive mode (see the rightmost light ray in FIG. 4), substantially the same operation as that during the reflective mode is performed from the lower substrate 13 to the upper substrate 14. Specifically, referring to FIG. 4, like on the side of the upper substrate 14, the lower polarizer 28 and the lower ¼-wave plate 27 are arranged on the side of the lower substrate 13. Clockwise circularly polarized light is incident on the liquid crystal layer 16 from the lower substrate 13, and 20% of the light is transmitted through the transflective layer 18. With the liquid crystal set to be off, the light becomes counterclockwise circularly polarized light when reaching the upper substrate 14. The counterclockwise circularly polarized light becomes linearly polarized light having the polarization axis perpendicular to the plane of the page when being transmitted through the upper ¼-wave plate 35. The linearly polarized light does not reach the outside (the viewer) but is absorbed by the upper polarizer 36. A dark display is thus presented on the liquid crystal display device.

When a light display is presented during the transmissive mode (a second light ray from the left in FIG. 4), the light incident from below the lower substrate 13 becomes linearly polarized light having the polarization direction parallel with the plane of the page when being transmitted through the lower polarizer 28, and then becomes clockwise circularly polarized light when being transmitted through the lower ¼-wave plate 27. Then, 20% of the output clockwise circularly polarized light is transmitted through the transflective layer 18 formed of the cholesteric liquid crystal, and is then output as clockwise circularly polarized light. When the liquid crystal is on, 20% of the clockwise circularly polarized light reaches the upper substrate 14 still in that polarization state. The clockwise circularly polarized light becomes linearly polarized light having the polarization axis parallel with the plane of the page when being transmitted through the upper ¼-wave plate. The linearly polarized light is transmitted through the upper polarizer 36, returning to the outside (the viewer) and thereby presenting a light display on the liquid crystal display device.

With the light display presented during the transmissive mode, 80% of the clockwise circularly polarized light is reflected from the transflective layer 18 including the cholesteric liquid crystal. As described above, the cholesteric liquid crystal in nature does not change the rotation direction of the reflected circularly polarized light. The reflected light is the clockwise circularly polarized light. The clockwise circularly polarized light becomes linearly polarized light having the polarization axis parallel with the plane of the page when being transmitted through the lower ¼-wave plate 27. The linearly polarized light is transmitted through the lower polarizer 28 having the transmission axis parallel with the plane of the page. When the linearly polarized light having the polarization axis in alignment with the transmission axis of the lower polarizer 28 exits from the lower substrate 13 in this way, the light is then reflected from a reflective plate 40 arranged in the backlight 12, and then reintroduced to the side of the liquid crystal cell for reuse.

In case of a dark display, which is not yet discussed, during the transmissive mode, the light incident from the lower substrate 13 becomes linearly polarized light having the polarization axis parallel to the plane of the page when being transmitted through the lower substrate 13, and then becomes clockwise circularly polarized light when being transmitted through the lower ¼-wave plate 27. The clockwise circularly polarized light is output. Then, 80% of the clockwise circularly polarized light is reflected from the transflective layer 18 comprising the cholesteric liquid crystal. After being output outwardly of the liquid crystal cell 11 from the lower substrate 13, the light is then reintroduced into the liquid crystal cell 11 again. This light does not affect the dark display, because it is simply absorbed by the upper polarizer 36. When a light display is presented during the reflective mode, 20% of clockwise circularly polarized light input from above is transmitted through the transflective layer 18. After being output out of the liquid crystal cell 11 from the lower substrate 13, the light is then reintroduced into the liquid crystal cell 11. This light contributes to image displaying, thereby keeping the display bright also during the reflective mode.

In the liquid crystal display device of the present invention, the same display mode can be used for reflection and transmission. Particularly, when a light display is presented during the transmissive mode, a portion of the light incident on the lower substrate is not absorbed by the upper polarizer unlike in the related art transflective liquid crystal display device. Most of the light transmitted through the transflective layer fabricated of the cholesteric liquid crystal contributes to image displaying. The light reflected from the transflective layer fabricated of the cholesteric liquid crystal is reused to provide image displaying. The ratio of 80% for reflection to 20% for transmission at the cholesteric liquid crystal is one example only, and any ratio of reflection to transmission may be used. At any ratio, the effect that the circularly polarized light transmitted through the transflective layer formed of the cholesteric liquid crystal is fully taken advantage of is combined with the effect that the circularly polarized light reflected from the transflective layer is reused. The lightness level in the display caused by the transmitted light is heightened while the lightness level in the display caused by the reflected light is maintained. The transflective-type liquid crystal display device providing an excellent visibility results.

In the above discussion, the light rays introduced from the upper substrate and the light introduced from the lower substrate are the "clockwise circularly polarized light" in an ideal arrangement. It is not necessary that the light be completely circularly polarized light in the operation of the liquid crystal display device of the present invention. In a broad sense, the "elliptically polarized light" is also acceptable.

The transflective-type liquid crystal display device having one of the above arrangements of the present invention preferably includes an illumination device to cause light to enter the liquid crystal cell from the lower substrate.

To equalize lightness level between during the transmissive display mode and during the reflective display mode in the transflective-type liquid crystal display device of this invention, some method is required to cause the elliptically polarized light to enter the liquid crystal cell through the lower substrate. Any method is acceptable. For example, a so-called backlight may be arranged as an illumination device to cause the light from the lower substrate to enter the liquid crystal cell. The elliptically polarized light is thus easily emitted from the lower substrate.

In the liquid crystal display device of the present invention having one of the above arrangements, a specific example of the upper-substrate side elliptically-polarized-light input device may include a polarizer to transmit linearly polarized light aligned in one direction and a retardation film to convert the linearly polarized light transmitted through the polarizer into elliptically polarized light.

In the transflective liquid crystal display device of the present invention having one of the above arrangements, a specific example of the lower-substrate side elliptically-polarized-light input device may include a polarizer to transmit linearly polarized light aligned in one direction and a retardation film to convert the linearly polarized light transmitted through the polarizer into elliptically polarized light.

The use of the two optical members of the polarizer and the retardation film easily converts external light, such as sunlight or illumination light or light from the backlight into elliptically polarized light, thereby making the light be preferable for the liquid crystal display device of the present invention.

The retardation film may be preferably a ¼-wave plate, although any type is acceptable as long as it provides an arbitrary phase delay.

When the ¼-wave plate is used, linearly polarized light exiting from the polarizer is converted into circularly polarized light, in particular, from among elliptically polarized light in a broad sense. The utilization of light is heightened, and the liquid crystal display device presents a bright display. To impart a color compensation function to the retardation film on the side of the upper substrate, the retardation film is not limited to the ¼-wave plate. The retardation film having any phase delay may be selected.

In the liquid crystal display device of the present invention having one of the above arrangements, the reflective layer or the transflective layer includes a plurality of cholesteric liquid crystal layers having different helical pitches of the liquid crystal molecules. The cholesteric liquid crystal layers arranged in this way, function as a reflective layer which reflects circularly polarized light of a variety of wavelengths, in other words, functions as a white-color reflecting plate.

In the liquid crystal display device, the cholesteric liquid crystal layer may function as a color filter that selectively reflects color light rays having different wavelengths respectively corresponding to helical pitches of liquid crystal molecules in predetermined regions into which a display area of the liquid crystal cell is divided.

In the cholesteric liquid crystal layer in the liquid crystal display device of the present invention, the helical pitch of the liquid crystal molecules is changed every predetermined region into which the display area of the liquid crystal cell is divided, and light having a wavelength corresponding to the helical pitch is selectively reflected every predetermined region. The cholesteric liquid crystal thus functions as a reflective color filter, in which each region in the display area functions as a reflective-type color filter for red (R), green (G), or blue (B). The liquid crystal display device thus presents a color display different in color from dot to dot in the display area. In this case, the cholesteric liquid crystal layer mainly functions as a reflective-display color filter.

The liquid crystal display device of the present invention having one of the above arrangements may include a color filter layer including a plurality of color layers having different color pigments between one of the reflective layer and the transflective layer and the first conductor.

The liquid crystal display device in this arrangement presents a color display.

If the liquid crystal display device of the present invention is of a transflective type, the liquid crystal display device presents an excellent visibility with a bright color display, particularly, during the transmissive mode.

In the liquid crystal display device of the present invention having one of the above arrangements, the inter-substrate conductor is arranged in peripheral areas of the upper substrate and the lower substrate facing each other or is arranged within the sealing member.

In one example in which the inter-substrate conductor is arranged within the sealing member, the inter-substrate conductor may be the electrically conductive material such as anisotropically conductive particles mixed into the sealing member. The anisotropically conductive particles exhibit conductivity in the direction of the thickness of the sealing member but no conductivity in the direction of width of the sealing member.

Electronic apparatus of the present invention may includes the liquid crystal display device of one of the above arrangements.

This arrangement results in the liquid crystal display device of the present invention in which no electronic components are mounted on the cholesteric liquid crystal layer and the electronic component is reliably electrically connected to the conductor. The yield of the electronic apparatus is free from a drop caused due to a connection failure between the electronic component and the conductor connected thereto. The reliability of the electronic apparatus is thus enhanced.

The electronic apparatus incorporating the compact liquid crystal display device of the present invention with the narrow peripheral areas has a wide display area for the compact size thereof, and provides excellent portability.

The electronic apparatus incorporating the liquid crystal display device of the present invention with the symmetrical peripheral areas on both sides of the substrate has also equal frame margins on both sides (the top and bottom sides or left and right sides) of the display screen. Good-looking electronic apparatus thus results.

The electronic apparatus incorporating the transflective-type liquid crystal display device of the present invention as a display unit presents an excellent visibility with a bright display during the transmissive mode.

First Embodiment: Liquid Crystal Display Device

A first embodiment of the present invention is discussed below with reference to FIG. 1 through FIG. 3.

Figure 1:
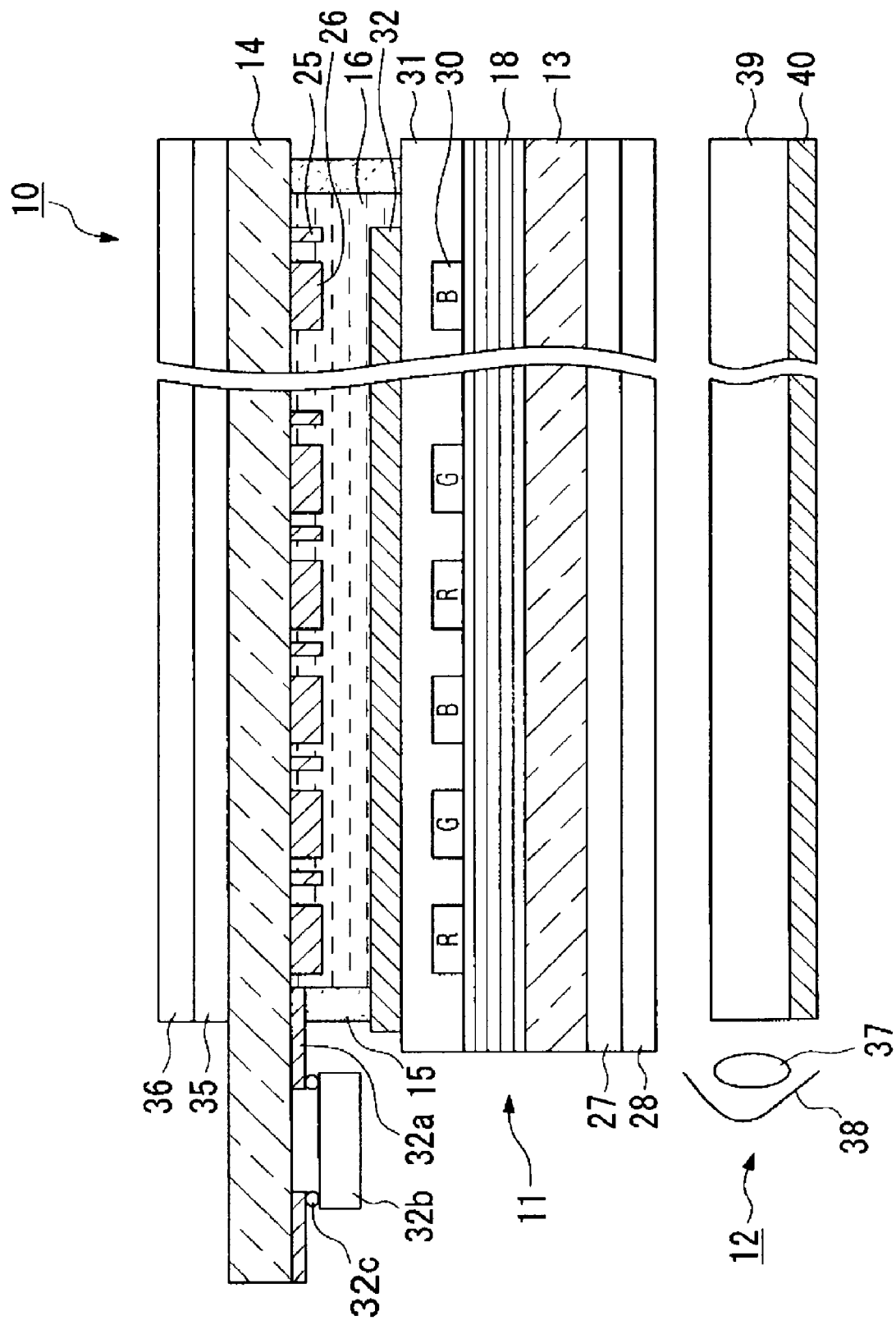
FIG. 1 is a cross-sectional view partly illustrating a liquid crystal display device in accordance with a first embodiment of the present invention.
Figure 2:
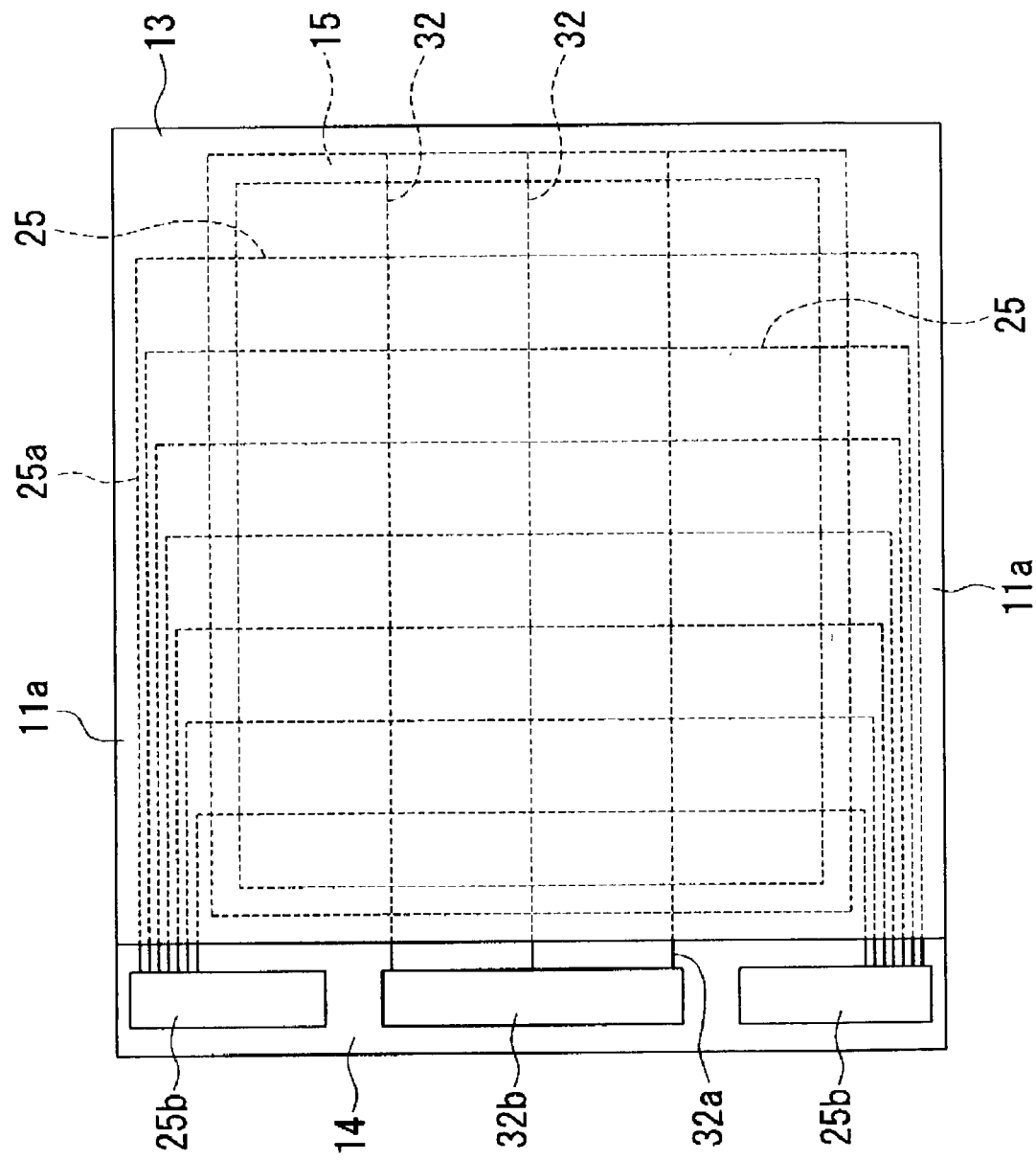
FIG. 2 is a plan view of a liquid crystal cell of the liquid crystal display device of the first embodiment viewed from below a lower substrate.

FIG. 1 is a cross-sectional view partly illustrating the liquid crystal display device of this embodiment. FIG. 2 is a plan view in which a liquid crystal cell of the liquid crystal display device of the first embodiment is viewed from below a lower substrate. FIG. 3 is a schematic that illustrates the principle of image displaying of the liquid crystal display device of the first embodiment. This embodiment is an example of a transflective-type color liquid crystal display device of an active-matrix type using a thin-film diode (hereinafter referred to as TFD) as a switching element. In all the drawings, the thicknesses and dimensions of the components are differentiated as appropriate for clarification of the drawings.

A liquid crystal display device 10 of this embodiment includes a liquid crystal cell 11 and a backlight 12 (an illumination device) as shown in FIG. 1. In the liquid crystal cell 11, a lower substrate 13 and an upper substrate 14 are opposed to each other with a sealing member 15 interposed therebetween. A liquid crystal layer 16 formed of an STN (Super-Twisted Nematic) liquid crystal is encapsulated in an enclosed space defined by the upper substrate 14, the lower substrate 13, and the sealing member 15. The backlight 12 is arranged behind the liquid crystal cell 11 (on the outer surface of the lower substrate 13).

Arranged on the inner surface of the lower substrate 13 fabricated of a light-transmissive material, such as glass or plastic, is a transflective layer 18 including a laminate of alignment layers and cholesteric liquid crystal layers with one layer alternating with another layer.

A plurality of cholesteric liquid crystal layers included in the transflective layer 18 has different helical pitches of the liquid crystal molecules thereof. For example, the cholesteric liquid crystal layer having the helical pitch of approximately 450 nm of the liquid crystal molecules selectively reflects blue color light, the cholesteric liquid crystal layer having the helical pitch of approximately 550 nm of the liquid crystal molecules selectively reflects green color light, and the cholesteric liquid crystal layer having the helical pitch of approximately 650 nm of the liquid crystal molecules selectively reflects red color light. As a whole, the transflective layer 18 selectively reflects white color light. Each cholesteric liquid crystal layer reflects a portion of circularly polarized light having a predetermined rotation direction while transmitting another portion of the light. In this embodiment, the cholesteric liquid crystal layer reflects 80% of clockwise rotating circularly polarized light (hereinafter referred to as clockwise circularly polarized light) while transmitting 20% of the light. The transflective layer 18 generally reflects 80% of the clockwise circularly polarized white light while transmitting 20% of the light.

The thickness of the transflective layer 18 falls within a range of about 5 to 20 µm.

To produce the transflective layer 18, an alignment layer is applied on a glass substrate or a plastic sheet forming the lower substrate 13, and is then subjected to a rubbing process. A solution containing a cholesteric liquid crystal is applied on the surface of the alignment layer using one of a variety of application methods, such as a spin coater, and is then irradiated with ultraviolet light to cure the solution to form the cholesteric liquid crystal layer. The helical pitch of the liquid crystal molecules is controlled by controlling the intensity of ultraviolet light or temperature when the cholesteric liquid crystal is irradiated with the ultraviolet light to be cured. The liquid crystal molecules have a periodic helical structure with a constant pitch. The formation of the alignment layer subjected to the rubbing process and the formation of the cholesteric liquid crystal layer are alternately repeated to obtain the intended transflective layer 18.

An overcoat layer (not shown) formed of a light-transmissive resin material is deposited on the transflective layer 18. A color filter 30, arranged on the overcoat layer, includes periodically repeated color layers of R (red), G (green), and B (blue). A planarization layer 31 is formed on the color filter 30 (color layers containing pigments) to planarize steps caused in the color filter 30. A number of rectangular scanning lines (the first conductor) 32 formed of an electrically conductive transparent layer, such as of ITO, extends on the planarization layer 31 in a horizontal direction (in a direction parallel with the plane of the page). An alignment layer (not shown), fabricated of polyimide, is arranged on the scanning lines 32.

Arranged on the outer surface of the lower substrate 13 are a lower ¼-wave plate 27, a lower polarizer 28, and a reflective polarizer 29 in that order. In this embodiment, the lower-substrate side elliptically-polarized-light input device to cause the elliptically polarized light to enter the liquid crystal layer 16 from the lower substrate 13 includes the lower polarizer 28 and the lower ¼-wave plate 27. In this embodiment, the transmission axis of the lower polarizer 28 is in parallel with the plane of the page of FIG. 3, and when linearly polarized light aligned in this direction is input to the lower ¼-wave plate 27, clockwise circularly polarized light is output. Any retardation plate may be substituted for the lower ¼-wave plate 27. Any retardation plate is used as long as the retardation plate has the function of converting the linearly polarized light transmitted through the lower polarizer 28 into circularly polarized light.

A number of rectangular data lines (the second conductors) 25 formed of an electrically conductive transparent film fabricated of ITO extends, on the inner surface of the upper substrate 14 fabricated of a light-transmissive material, such as glass or plastic, in a direction orthogonal to the scanning lines (first conductors) 32 above the lower substrate 13. A number of pixel electrodes 26 is connected to respective data lines 25 through TFD elements (not shown). For example, the TFD element is formed of a first conductive film fabricated of tantalum, an insulator film formed of a tantalum oxide film which is produced by anodizing the surface of the first conductive film, and a second conductive film formed of a metal film of chromium, aluminum, titanium, or molybdenum, formed on the surface of the insulator film. The first conductive film of the TFD element is connected to the data line 25 while the second conductive film of the TFD is connected to the pixel electrode 26. Referring to FIG. 2, lines (the second conductors) 25a connected to the data lines 25 are formed on right and left peripheral areas (right and left frame margins) on the upper substrate 14 outside the sealing member 15.

An alignment layer (not shown), fabricated of polyimide, is deposited to cover the data lines 25, the pixel electrodes 26, and the TFD elements.

Arranged on the outer surface of the upper substrate 14 are an upper ¼-wave plate 35 and an upper polarizer 36 in that order. In this embodiment, the upper-substrate side elliptically-polarized-light input device to cause elliptically polarized light to enter the liquid crystal layer 16 from the upper substrate 14 includes the upper ¼-wave plate 35 and the upper polarizer 36. In this embodiment, the transmission axis of the upper polarizer 36 is in parallel with the plane of the page of FIG. 3, and when linearly polarized light aligned in this direction is input to the upper ¼-wave plate 35, clockwise circularly polarized light is output. Any retardation plate may be substituted for the upper ¼-wave plate 35. Any retardation plate is used as long as the retardation plate converts the linearly polarized light transmitted through the upper polarizer 36 into circularly polarized light.

The inter-substrate conductor is formed by mixing anisotropically conductive particles (not shown) having a diameter of about 5 μm or so as conductors into the sealing member 15. The anisotropically conductive particles may exhibit conductivity in the direction of thickness of the sealing member 15 and non-conductivity in the direction of the width of the sealing member 15. The inter-substrate conductors are respectively connected to the scanning lines 32 arranged on the lower substrate 13.

COG-mounted on the inner surface of the upper substrate 14 outside the sealing member are data-line driving ICs (electronic components) 25b to supply the data line 25 with a display signal, and a scanning-line driving IC (electronic component) 32b to supply the scanning line 32 with a scanning signal. The data-line driving ICs 25b are arranged on both sides of the scanning-line driving IC 32b. Referring to FIG. 2, the data-line driving ICs (electronic components) 25b and the scanning-line driving IC (electronic component) 32b are arranged on the same side of the upper substrate 14.

Interconnection wirings 32a are arranged on the inner surface of the upper substrate 14 outside the sealing member to connect the scanning-line driving IC (electronic component) 32b to the inter-substrate conductor (not shown) in the sealing member 15.

The data-line driving ICs 25b are electrically connected to the data lines 25 by connecting to the routed wirings (second conductors) through electrically conductive particles (not shown), such as solder balls.

The scanning-line driving IC 32b is electrically connected to the scanning lines 32 connected to the inter-substrate conductors by connecting to the inter-substrate conductors arranged in the sealing member 15 through the electrically conductive particles 32c, such as solder balls.

The liquid crystal layer 16 reverses the rotation direction of the circularly polarized light that is incident depending on the presence or absence of a selection electric field. For example, during the non-selection voltage applied state (with the liquid crystal set to be off), the liquid crystal layer has a phase difference of λ/2 (λ: wavelength of the incident light) with the liquid crystal molecules lying down. Clockwise circularly polarized light becomes counterclockwise circularly polarized light when being transmitted through the liquid crystal layer, and counterclockwise polarized light becomes clockwise polarized light when being transmitted through the liquid crystal layer. When the liquid crystal molecules are in their upright position during the selection voltage applied state (with the liquid crystal set to be on), the liquid crystal layer has no phase difference. The rotation direction of the circularly polarized light remains unchanged.

The backlight 12 includes a light source 37, a reflective plate 38, and a light guide 39. Arranged on the bottom surface of the light guide 39 (on the surface of the light guide 39 opposite from the side of the liquid crystal panel 1) is a reflective plate 40 to cause light transmitted through the light guide 39 to exit toward the liquid crystal cell 11.

The principle of image displaying of the liquid crystal display device of this embodiment and the reason why the light reflected from the transflective layer is reused are discussed with reference to FIG. 3. In the discussion that follows, light entering the color filter layer 30 in the liquid crystal cell from outside the upper substrate 14 or the lower substrate 13 enters an R color layer.

Figure 3:
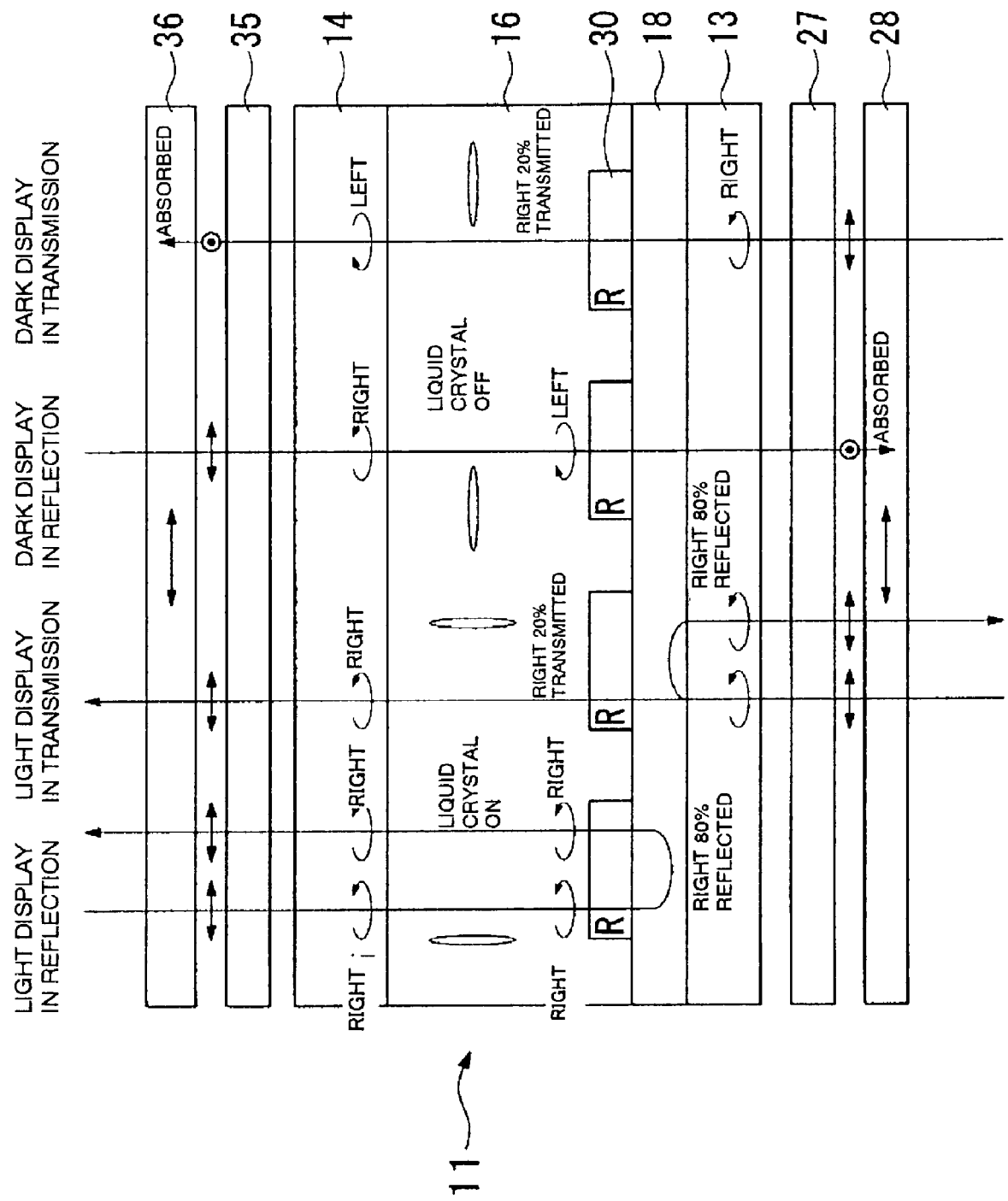
FIG. 3 is a schematic that illustrates the principle of image displaying of the liquid crystal display device of the first embodiment.

To present a light display during the reflective mode in the liquid crystal display device illustrated in FIG. 3 (see the leftmost light ray in FIG. 3) of the present embodiment, the light to be incident on the upper substrate 14 from outside becomes linearly polarized light having the polarization axis parallel with the plane of the page when being transmitted through the upper polarizer 36, and then becomes clockwise circularly polarized light when being transmitted through the upper ¼-wave plate 35. With the liquid crystal set to be on, the rotation direction of the circularly polarized light remains unchanged unlike the above case. When the clockwise circularly polarized light is incident on the liquid crystal layer 16, the clockwise circularly polarized light remains unchanged when it reaches the transflective layer 18 after being transmitted through the liquid crystal layer 16, and the color filter layer 30.

Therefore, 80% of the red clockwise circularly polarized light that results after the circularly polarized light passes through R color layer is reflected from the transflective layer 18 on the lower substrate 13, and is then transmitted through the liquid crystal layer 16 toward the upper substrate 14. Since the liquid crystal is on, the polarization state of the light remains unchanged from the clockwise direction. However, the light becomes linearly polarized light having the polarization axis parallel with the plane of the page when being transmitted through the upper ¼-wave plate 35. The linearly polarized light is transmitted through the upper polarizer 36, thereby returning to the outside (the viewer), and thereby presenting a light (red) display on the liquid crystal display device.

When a dark display is presented during the reflective mode (see a second light ray from the right in FIG. 3), and the liquid crystal is set to an off state, the liquid crystal layer 16 has a phase difference of $\lambda/2$. Clockwise circularly polarized light incident on the upper substrate 14 from above becomes counterclockwise circularly polarized light when being transmitted through the liquid crystal layer 16. Referring to FIG. 3, the cholesteric liquid crystal layer forming the transflective layer 18 reflects a portion of the clockwise circularly polarized light, while transmitting counterclockwise circularly polarized light through the transflective layer 18. Then, when being transmitted through the lower ¼-wave plate 27, the light becomes linearly polarized light having the polarization axis perpendicular to the plane of the page. This linearly polarized light does not return to the outside (the viewer) but is absorbed by the lower polarizer 28. A dark display is thus presented on the liquid crystal display device.

When a display is presented during the transmissive mode, the light emitted from the backlight 12 enters the liquid crystal cell 11 from outside the lower substrate 13, and becomes light contributing to image displaying. To present a dark display during the transmissive mode (see the rightmost light ray in FIG. 3), substantially the same operation as that during the reflective mode is performed from the lower substrate to the upper substrate. Specifically, referring to FIG. 3, like on the side of the upper substrate, the lower polarizer 28 and the lower ¼-wave plate 27 are arranged on the side of the lower substrate. Clockwise circularly polarized is incident on the liquid crystal layer 16 from the lower substrate, and 20% of the light is transmitted through the transflective layer 16. With the liquid crystal set to be off, the light becomes counterclockwise circularly polarized light when reaching the upper substrate. The counterclockwise circularly polarized light becomes linearly polarized light having the polarization axis perpendicular to the plane of the page when being transmitted through the upper ¼-wave plate 35. The linearly polarized light does not reach the outside (the viewer) but is absorbed by the upper polarizer 36. A dark display is thus presented on the liquid crystal display device.

A light display is now presented during the transmissive mode (a second light ray from the left in FIG. 3). The light incident from below the lower substrate becomes linearly polarized light having the polarization axis parallel with the plane of the page when being transmitted through the lower polarizer 28, and then becomes clockwise circularly polarized light when being transmitted through the lower ¼-wave plate 27. Then, 20% of the output clockwise circularly polarized light is transmitted through the transflective layer 18 formed of the cholesteric liquid crystal, is transmitted through the color layer of the color filter layer 30, and is then output as red color, clockwise circularly polarized light. When the liquid crystal is on, 20% of the clockwise circularly polarized light reaches the upper substrate 14 still in that polarization state. The clockwise circularly polarized light becomes linearly polarized light having the polarization axis parallel with the plane of the page when being transmitted through the upper ¼-wave plate 35. The linearly polarized light is transmitted through the upper polarizer 36, returning to the outside (the viewer) and thereby presenting a light (red) display on the liquid crystal display device.

With the light display presented during the transmissive mode, 80% of the clockwise circularly polarized light is reflected from the transflective layer 18 formed of the cholesteric liquid crystal. As described above, the cholesteric liquid crystal in nature does not change the rotation direction of the reflected circularly polarized light. The reflected light is the clockwise circularly polarized light. The clockwise circularly polarized light becomes linearly polarized light having the polarization axis parallel with the plane of the page when being transmitted through the lower ¼-wave plate 27. The linearly polarized light is transmitted through the lower polarizer 28 having the transmission axis parallel with the plane of the page. When the linearly polarized light having the polarization axis in alignment with the transmission axis of the lower polarizer 28 exits from the lower substrate in this way, the light is then reflected from a reflective plate 40 arranged in the backlight 12, and then reintroduced to the side of the liquid crystal cell for reuse.

In the liquid crystal display device of this embodiment, the same display mode can be used for reflection and transmission. Particularly, when a light display is presented during the transmissive mode, a portion of the light incident on the lower substrate is not absorbed by the upper polarizer unlike in the related art transflective liquid crystal display device. Most of the light transmitted through the transflective layer 18 fabricated of the cholesteric liquid crystal contributes to image displaying. The light reflected from the transflective layer 18 fabricated of the cholesteric liquid crystal is reused to provide image display. In the liquid crystal display device of this embodiment, the effect that the circularly polarized light transmitted through the transflective layer 18 formed of the cholesteric liquid crystal is fully taken advantage of is combined with the effect that the circularly polarized light reflected from the transflective layer 18 is reused. The lightness level in the display caused by the transmitted light is heightened while the lightness level in the display caused by the reflected light is maintained. The transflective-type liquid crystal display device providing an excellent visibility results.

In the liquid crystal display device of this embodiment, the scanning-line driving IC 32b connected to the scanning lines 32 arranged on the lower substrate 13 and the data-line driving ICs 25b electrically connected to the data lines 25 arranged on the upper substrate 14 are mounted on the substrate having no transflective layer 18 including the plurality of cholesteric liquid crystal layers, namely, on the upper substrate 14. Since the electronic components, such as the scanning-line driving IC 32b, are not mounted on the cholesteric liquid crystal layer, the scanning-line driving IC 32b, are thus reliably electrically connected to the scanning lines 32. In this way, the yield and quality of the product are enhanced.

The scanning lines 32 arranged on the lower substrate 13 are electrically connected to the scanning-line driving IC 32b arranged on the upper substrate 14 through the inter-substrate conductors arranged in the sealing member 15.

In this embodiment, the scanning-line driving IC 32b and the data-line driving ICs 25b are arranged on the same side of the upper substrate 14. The electronic components are thus mounted on the one side of the liquid crystal cell 11. There is no need to arrange areas for electronic components on the remaining three sides of the liquid crystal cell 11. The widths of frame peripheral portions 11a on both right and left sides or top and bottom sides of the substrate are equalized. A compact liquid crystal display device with narrow peripheral areas thus results.

In the above discussion about the liquid crystal display device of this embodiment, the transflective layer 18 having a plurality of cholesteric liquid crystal layers reflects a portion of white circularly polarized light having the same direction of rotation as that of the helical structure while transmitting another portion of the light. The transflective layer 18 may include the cholesteric liquid crystal layer that has a function as a reflective color filter which selectively reflects color light rays of different wavelengths corresponding to the helical pitches of the liquid crystal molecules in each of regions into which the display area of the liquid crystal cell 11 is divided.

Electronic Apparatus

Electronic apparatus incorporating one of the liquid crystal display devices of the above embodiments are discussed below.

Figure 5:
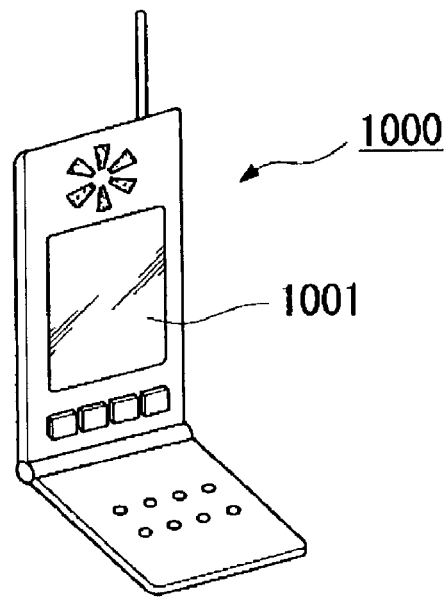
FIG. 5 is a perspective view illustrating one example of the electronic apparatus of the present invention.

FIG. 5 is a perspective view of a mobile telephone. FIG. 5 shows a mobile telephone 1000, and a liquid crystal display 1001 incorporating the above described liquid crystal display device.

Figure 6:
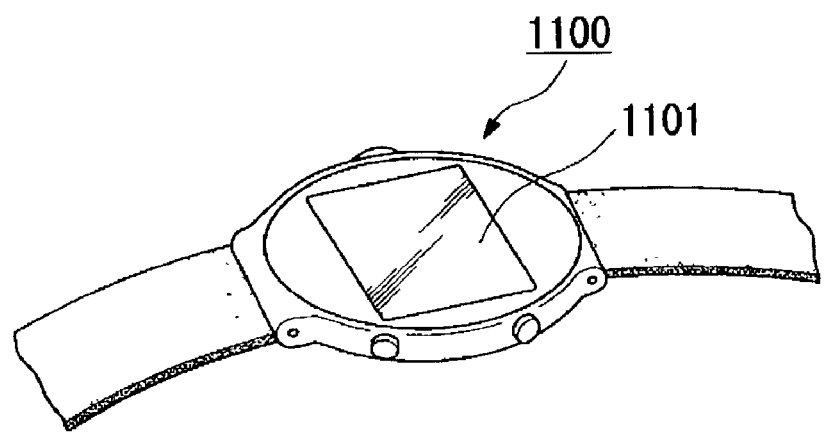
FIG. 6 is a perspective view illustrating another example of the electronic apparatus of the present invention.

FIG. 6 is a perspective view of a wristwatch, as one example of the electronic apparatus. FIG. 6 shows a wristwatch 1100, and a liquid crystal display 1101 incorporating the above-referenced liquid crystal display device.

Figure 7:
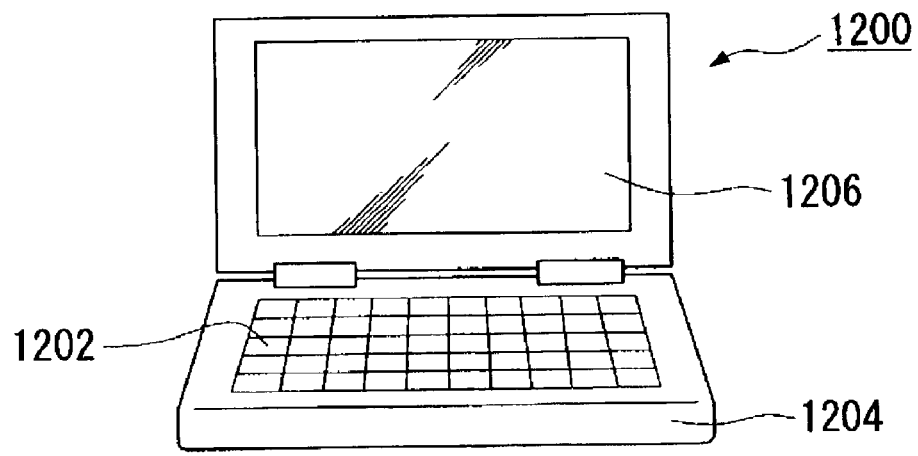
FIG. 7 is a perspective view illustrating yet another example of the electronic apparatus of the present invention.
Figure 8:
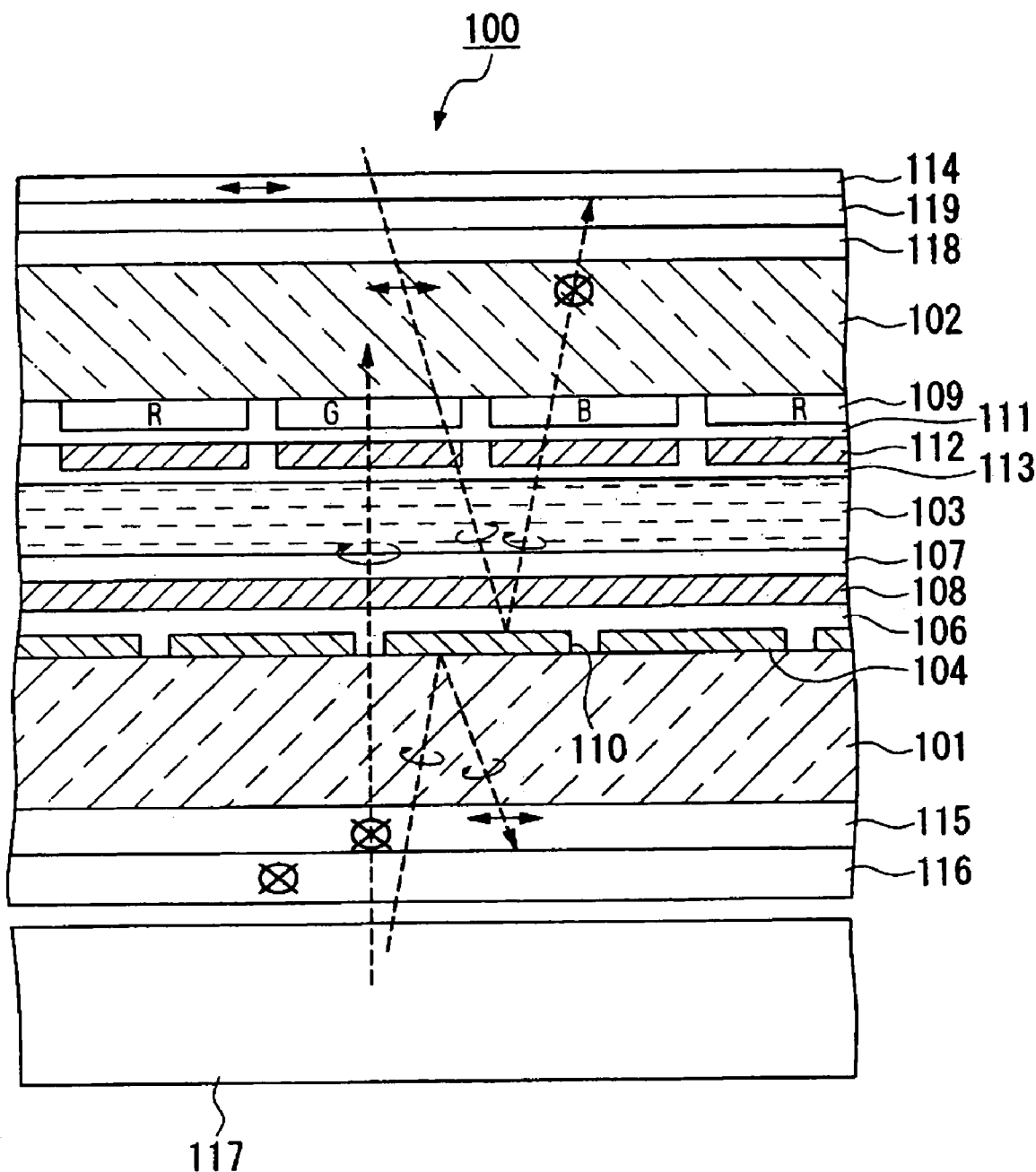
FIG. 8 is a cross-sectional view partly illustrating a related art liquid crystal display device.

FIG. 7 is a perspective view of one example of a mobile information processing device such as a word processor or a personal computer. FIG. 7 shows an information processing device 1200, an input device 1202, such as a keyboard, an information processing device main unit 1204, and a liquid crystal display 1206 incorporating the above-referenced liquid crystal display device.

In the electronic apparatus illustrated in FIG. 5 through FIG. 7, the electronic components, such as the scanning-line driving IC 32b, are not mounted on the inner surface of the lower substrate 13 having the cholesteric liquid crystal layer thereon. The first conductor, such as the scanning lines 32, are reliably connected to the electronic components. The electronic apparatus incorporates the liquid crystal display device 10 of this embodiment as a display thereof. In this arrangement, a drop in the yield due to a connection failure between the electronic component and the first conductor connected thereto is reduced, and more reliable electronic apparatus is thus provided.

The electronic apparatus incorporating the compact liquid crystal display device 10 of the present embodiment with the narrow peripheral areas has a wide display area for the compact size thereof, and provides excellent portability.

The electronic apparatus incorporating the liquid crystal display device 10 of the present embodiment with the symmetrical peripheral areas on both sides of the substrate also has equal frame margins on both sides (for example, on the left and right sides) of the display screen. A good-looking electronic apparatus thus results.

The electronic apparatus incorporating the liquid crystal display device 10 of the present embodiment as a display unit presents a bright display during the transmissive mode.

The present invention is not limited to the above-referenced embodiments, and a variety of modifications is possible without departing from the scope of the present invention.

The present invention is not limited to an active-matrix transflective-type liquid crystal display device employing the TFD as a switching element. The present invention may be applied to a transflective-type liquid crystal display device employing a thin-film transistor as a switching element, and a passive-matrix transflective-type liquid crystal display device. The present invention is not limited to the transflective-type liquid crystal display device. The present invention may be applied to a reflective-type liquid crystal display device. The present invention is not limited to the color liquid crystal display device. The present invention may be applied to a monochrome liquid crystal display device.

[Advantages]

As described in detail above, in the liquid crystal display device of the present invention, the electronic components are mounted outside the sealing member on the inner surface of the upper substrate having neither a reflective layer nor a transflective layer containing the cholesteric liquid crystal layer. The electronic components are electrically connected to the second conductors, and are electrically connected to the first conductors through the inter-substrate conductors. This arrangement precludes a connection failure caused due to the ingress of a conductive material, such as a solder ball, into the cholesteric liquid crystal layer which could occur if the electronic components are mounted to be connected to the conductor arranged on the substrate having the cholesteric liquid crystal layer thereof. The electronic apparatus incorporating such a liquid crystal display device is free from a drop in the yield attributed to the connection failure between the conductor formed on the substrate having the cholesteric liquid crystal layer thereon and the electronic component connected thereto. The electronic apparatus incorporating a reliable liquid crystal device is thus obtained.

The liquid crystal display device having the transflective layer containing the cholesteric liquid crystal layer which reflects a portion of the elliptically polarized light having the predetermined rotation direction while transmitting another portion of the light, provides an excellent visibility with a bright display during the transmissive mode. The electronic apparatus incorporating such a liquid crystal display device presents an excellent visibility with a bright display during the transmissive mode.

What is claimed is:

1. A liquid crystal display device, comprising:
   a liquid crystal cell including an upper substrate and a lower substrate, mutually facing and bonded to each other with a sealing member interposed therebetween, a liquid crystal layer encapsulated between the upper substrate and the lower substrate, a first conductor arranged on the inner surface side of the lower substrate; and a second conductor arranged on the inner surface side of the upper substrate;
   a reflective layer including a plurality of cholesteric liquid crystal layers, between the lower substrate and the first conductor, to reflect at least a portion of elliptically polarized light having a predetermined rotation direction, the plurality of cholesteric liquid crystal layers being laminated on top of each other, at least one of the plurality of cholesteric liquid crystal layers having a different helical pitch from the others in order to reflect white light;
   an upper-substrate side elliptically-polarized-light input device to cause elliptically polarized light to enter the liquid crystal layer from the upper substrate side, the liquid crystal layer reversing the component of elliptically polarized light that is incident during one of a selection electric field applied state and a non-selection electric field applied state, and not changing the component of the elliptically polarized light during the other of the selection electric field applied state and the non-selection electric field applied state; and
   an IC mounted on the inner surface side of the upper substrate outside the sealing member, the IC being electrically connected to the second conductor, while being electrically connected to the first conductor through an inter-substrate conductor.

2. The liquid crystal display device according to claim 1, the reflective layer being a transflective layer including a cholesteric liquid crystal layer to reflect a portion of elliptically polarized light having a predetermined rotation direction while transmitting the other portion of the elliptically polarized light therethrough, and
   the liquid crystal display device further including a lower-substrate side elliptically-polarized-light input device to cause elliptically polarized light to enter from the lower substrate side.

3. The liquid crystal display device according to claim 2, further including an illumination device to cause light to enter the liquid crystal cell from the lower substrate side.

4. The liquid crystal display device according to claim 1, the upper-substrate side elliptically-polarized-light input device including a polarizer to transmit linearly polarized light aligned in one direction and a retardation film to convert the linearly polarized light transmitted through the polarizer into elliptically polarized light.

5. The liquid crystal display device according to claim 2, the lower-substrate side elliptically-polarized-light input device including a polarizer to transmit linearly polarized light aligned in one direction and a retardation film to convert the linearly polarized light transmitted through the polarizer into elliptically polarized light.

6. The liquid crystal display device according to claim 1, the cholesteric liquid crystal layer functioning as a reflective color filter that selectively reflects color light rays having different wavelengths respectively corresponding to helical pitches of liquid crystal molecules in predetermined regions thereof into which a display area of the liquid crystal cell is divided.

7. The liquid crystal display device according to claim 1, further including a color-filter layer including a plurality of color layers having different color pigments between the reflective layer and the first conductor.

8. The liquid crystal display device according to claim 1, the reflective layer including a plurality of cholesteric liquid crystal layers stacked one on top of the other in a direction from the lower substrate to the liquid crystal layer, each of the cholesteric liquid crystal layers having different helical pitches of the liquid crystal molecules.

9. The liquid crystal display device according to claim 1, the inter-substrate conductor being arranged in peripheral areas of the upper substrate and the lower substrate facing to each other or being arranged within the sealing member.

10. Electronic apparatus, comprising:
    the liquid crystal display device according to claim 1.

11. A liquid crystal display device comprising:
    a liquid crystal cell including:
       a first substrate;
       a second substrate confronting the first substrate;
       a liquid crystal layer between the first substrate and the second substrate; and
       a sealing member sealing the liquid crystal between the first substrate and the second substrate;
    an IC mounted on the first substrate at a position outside the sealing member with respect to the liquid crystal layer;
    a first-substrate side elliptically-polarized-light input unit that converts incident light into elliptically-polarized-light and outputs the elliptically-polarized-light to the liquid crystal layer;
    a reflective layer including a cholesteric liquid crystal layer formed between the second substrate and the liquid crystal layer, the reflective layer including a plurality of cholesteric liquid crystal layers stacked one on top of the other in a direction from the second substrate to the liquid crystal layer, the cholesteric liquid crystal layers each having different helical pitches of the liquid crystal molecules; and
    a color filter layer disposed between the reflective layer and the liquid crystal layer.

12. A liquid crystal display device comprising:
    a liquid crystal cell including;
       a pair of substrates confronting each other; and
       a liquid crystal layer between the substrates;
    an IC mounted on one of the substrates;
    a first-substrate side elliptically-polarized-light input unit that converts incident light into elliptically-polarized-light and outputs the elliptically-polarized-light to the liquid crystal layer;
    a reflective layer including a cholesteric layer formed between the liquid crystal layer and an opposite substrate from the substrate on which the IC is mounted; and
    a color filter layer disposed between the reflective layer and the liquid crystal layer, the reflective layer including a plurality of cholesteric liquid crystal layers stacked one on top of the other in a direction from the second substrate to the liquid crystal layer, the cholesteric liquid crystal layers each having different helical pitches of the liquid crystal molecule.

* * * * *